US012597593B2

(12) United States Patent
Hughes et al.

(10) Patent No.: US 12,597,593 B2
(45) Date of Patent: Apr. 7, 2026

(54) MANUFACTURING METHOD FOR TRACEABILITY OF BATTERY ELECTRODES WITH FIDUCIAL MARKERS

(71) Applicant: Honeywell International Inc., Charlotte, NC (US)

(72) Inventors: Michael Hughes, North Vancouver (CA); Sudhir Thalore, North Vancouver (CA)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 796 days.

(21) Appl. No.: 17/666,505

(22) Filed: Feb. 7, 2022

(65) Prior Publication Data

US 2023/0253542 A1 Aug. 10, 2023

(51) Int. Cl.
| | |
|---|---|
| *H01M 4/139* | (2010.01) |
| *H01M 4/04* | (2006.01) |
| *H01M 10/04* | (2006.01) |
| *G01N 21/89* | (2006.01) |
| *H01M 4/16* | (2006.01) |
| *H01M 4/26* | (2006.01) |
| *H01M 10/42* | (2006.01) |

(52) U.S. Cl.
CPC ......... *H01M 4/139* (2013.01); *H01M 4/0435* (2013.01); *H01M 10/0404* (2013.01); *G01N 21/89* (2013.01); *H01M 4/16* (2013.01); *H01M 4/26* (2013.01); *H01M 10/4285* (2013.01); *Y02E 60/10* (2013.01)

(58) Field of Classification Search
CPC .. H01M 4/0435; H01M 4/139; H01M 4/4285; H01M 4/0404; H01M 10/0404; H01M 10/4285; H01M 4/16; H01M 4/26; Y02E 60/10; G01N 21/89
See application file for complete search history.

(56) References Cited

U.S. PATENT DOCUMENTS

| | | | |
|---|---|---|---|
| 3,681,595 | A | 8/1972 | Dahlin |
| 4,921,574 | A | 5/1990 | Hu |
| 4,943,721 | A | 7/1990 | Vidrine |

(Continued)

FOREIGN PATENT DOCUMENTS

| | | | |
|---|---|---|---|
| CN | 112542618 A | 3/2021 | |
| EP | 0995076 B1 | 10/2002 | |
| JP | 2012256528 A | * 12/2012 | |

OTHER PUBLICATIONS

Oshida et al., "An electric double-layer capacitor with high capacitance and low resistance," in IEEE Transactions on Components, Hybrids, and Manufacturing Technology, vol. 15, No. 1, pp. 133-138, Feb. 1992. (Year: 1992).*
European search Report for corresponding EP Application No. 23154877.7.
Ostlund, "Towards total production monitoring of basis weight and moisture" Oct. 16, 2018.

(Continued)

*Primary Examiner* — A. Dexter Tugbang
(74) *Attorney, Agent, or Firm* — Seager, Tufte & Wickhem, LLP

(57) ABSTRACT

A method for manufacturing battery electrodes with enhanced traceability using fiducial markers. The method includes applying tracing codes and position codes to a substrate, synchronizing measurement profiles with accompanying tracing codes, and dynamically adjusting manufacturing parameters based on marker analysis. The invention improves quality control and traceability in battery electrode production.

17 Claims, 7 Drawing Sheets

(56) References Cited

U.S. PATENT DOCUMENTS

| | | | |
|---|---|---|---|
| 5,795,394 | A | 8/1998 | Belotserkovsky |
| 7,528,400 | B2 | 5/2009 | Duck |
| 8,021,517 | B2 | 9/2011 | Hughes |
| 8,596,861 | B2 | 12/2013 | Kane |
| 9,309,625 | B2 | 4/2016 | Backstrom |
| 10,041,673 | B2 | 8/2018 | Pathangay |
| 10,501,274 | B2 | 12/2019 | Ramakrishnan |
| 10,628,934 | B2 | 4/2020 | Weaver |
| 11,143,495 | B2 | 10/2021 | Hughes et al. |
| 2009/0191327 | A1 | 7/2009 | Lotz |
| 2009/0265127 | A1* | 10/2009 | Floeder .................. G01N 21/89 |
| | | | 702/82 |
| 2013/0004816 | A1 | 1/2013 | Berkowitz |
| 2018/0172432 | A1 | 6/2018 | Hughes |
| 2020/0096380 | A1 | 3/2020 | Nebel |
| 2021/0262776 | A1 | 8/2021 | Tixier |

OTHER PUBLICATIONS

NDC Technologies, "NDA Technologies announces new sensors for Li-ion battery" (https://chargedevs.com) Feb. 22, 2019.

Akutsu et al. "EdgeEye: an Online Coating Position Gauge for Battery Electrolyte Sheets" Yokogawa Technical Report English Edition, vol. 57, No. 1, 2014.

Thermo Scientific "Solutions for Lithium-ion Battery" Aug. 21, 2013.

Wood, et al "Performance Effects of Electrode Coating Defects and IR Thermography NDE for High-Energy Lithium-ion Batteries" Annual Merit Review, Oak Ridge National Laboratory Jun. 8, 2016.

Sharp et al. "Lithium-ion battery electrode inspection using pulse thermography" NDT&E International 64 (2014) 41-51.

Mohanty et al. "Non-destructive evaluation of slot-die-coated lithium secondary battery electrodes by in-line laser caliper and IR-thermography methods" Anal. Methods, 2014, 6, 674.

* cited by examiner

Cathode sheet (260)
Cathode sheet (262)

Solid electrolyte (264)

Anode sheet (266)
Anode sheet (268)

Solid electrolyte (270)

Cathode sheet (272)
Cathode sheet (274)

Solid electrolyte (276)

Anode sheet (278)
Anode sheet (280)

Cathode current collector (282)

Unit cell

Anode current collector (284)

Unit cell

Cathode current collector (286)

Unit cell

Anode current collector (288)

MANUFACTURING METHOD FOR TRACEABILITY OF BATTERY ELECTRODES WITH FIDUCIAL MARKERS

FIELD OF THE INVENTION

The present invention generally relates to quality control techniques for fabricating sheet materials and, more particularly, to methods of precisely matching measurements made during the production of coated sheet products such as electrochemical cell electrodes to finished products such as electrochemical batteries incorporating anodes and cathodes so as to permit defects found at a later stage of production to be traced to the sources of the measured properties.

BACKGROUND OF THE INVENTION

On-line measurements are used to detect properties of sheet materials during manufacture to enable prompt control of the sheetmaking processes and, thus, to assure sheet quality while reducing the quantity of substandard sheet material which is produced. One of the main complications in making on-line measurements during sheetmaking is that the physical properties of sheet materials usually vary in the machine direction as well as in the cross direction. ("Machine direction" refers to the direction of travel of the sheet material during manufacture, and the term "cross direction" refers to the direction across the surface of a sheet perpendicular to the machine direction.)

To detect variations in sheet materials, scanning sensors are employed that periodically traverse back and forth across a sheetmaking machine in the cross direction while detecting values of a selected sheet property such as basis weight or caliper along each scan. Normally, the sheet being produced is traversed from edge to edge during each scan. The time required for a typical scan is generally between a few seconds to tens of seconds depending on the cross-direction length which can be many meters. The rate at which measurement readings are provided by such scanners is usually adjustable; a typical rate is about one measurement reading every millisecond.

In practice, measurement information provided by scanning sensors is usually assembled after each scan to provide a "profile" of the detected sheet property in the cross direction. In other words, each profile is comprised of a succession of sheet measurements at adjacent locations in the cross direction. The purpose of the profiles is to allow cross-directional variations in sheet properties to be detected easily. Based upon the detected cross-directional variations in the detected sheet property, appropriate control adjustments may be made to the sheetmaking machine with the goal of reducing profile variations both in the cross direction and in the machine direction.

A scanning sensor that periodically traverses a sheet at generally constant speed cannot measure the selected sheet property at locations which are aligned exactly perpendicular to the longitudinal edges of the sheet. Because of the sheet velocity, scanning sensors actually travel diagonally across the sheet surface, with the result that consecutive scanning paths have a zig-zag pattern with respect to the direction perpendicular to the longitudinal edges of the sheet. In practice, it is typical to calculate an average of profile measurements over each scan.

In fabricating anode or cathode electrodes, a metal foil from metal rolls is continuously coated with a mixture of active material. To achieve and maintain the quality of continuous, roll-to-roll production of electrodes, there are constant, online measurements of quality factors that are strongly linked to battery performance. Slitting machines cut the finished coated metal foils into sheets of electrodes that are assembled into the cells and batteries. With current manufacturing techniques, once a battery is assembled, there is no readily available means of identifying and accessing specific data associated with the electrodes that are incorporated into a particular battery. The art is demanding improved production traceability so that purchasers can trace on-line measurements made during production of the electrodes all the way to the assembled electrochemical cells and batteries.

SUMMARY OF THE INVENTION

The present invention is based, in part, on the use reference marks or markings and associated tracing codes (collectively referred to as "fiducial markers") in manufacturing sheet materials such as electrodes, paper, plastics, and fabrics. The fiducial markers serve as reference points along the machine direction (MD) of a moving sheet of material. In one aspect, the invention is directed to a sheet production system that includes:

a sheet of material that moves in a machine direction (MD);

marking means for applying a series of markers and associated tracing codes on the sheet of material along the MD;

a computer configured to record a series of tracing codes that are applied on the sheet of material;

reader means for reading markers and associated tracing codes on the sheet of material;

sensor means for sensing a characteristic of the sheet of material at different locations along the MD to generate a characteristic profile of the sheet of material; and correlation means for correlating the characteristic profile with the series tracing codes on the sheet of material.

In another aspect, the invention is directed to a method of monitoring a sheet of material that includes:

(i) providing a sheet of metal substrate which moves in a machine direction (MD);

(ii) applying one or more coatings of electrode material onto the sheet of metal substrate to form a moving sheet of metal substrate having one or more coated regions and one or more uncoated regions;

(iii) applying a series of reference markers and associated tracing codes onto the sheet of metal substrate, wherein step (ii) occurs before or after step (iii), to form a moving sheet of metal substrate having one or more coated regions and one or more uncoated regions wherein (a) in the case wherein step (ii) occurs before step (iii), the series of reference markers and associated tracing codes are applied onto one or more uncoated regions whereas (b) in the case wherein step (iii) occurs after step (ii), the series of reference markers and associated tracing codes are applied onto one or more uncoated regions and/or onto one or more coated regions;

(iv) recording tracing codes that have been applied to create a database of tracing codes; and (v) measuring a physical property of the one or more of the coated regions along the MD to generate a measurement profile that is recorded wherein measurements of the physical property are synchronized with the tracing codes from the database so that different portions of the measurement profile are associated with one or more accompanying tracing codes.

The present invention enables customers to precisely match measurements made during production to finished products so that defects found at a later stage of production can be traced to the source measurements to achieve improved quality assurance. The invention allows better alignment among measurements made by different scanners especially in discontinuous batch processes.

The invention enables precise same-spot scanning wherein additional downstream follower scanners are setup to trace the exact measurement path of a first (upstream) scanner. For example, first and second scanners can be positioned before and after a coating process, respectively, to measure the coating thickness by subtracting the foil uncoated thickness from the total thickness.

The invention also enables precise same-spot scanning in batch-type, non-continuous operations where a plurality of measurements are executed at different stages of manufacture such as when a product roll is transferred to follower scanners located remotely from the first scanner. For example, a product material can be rolled up after the first scanner and fed to follower scanners at a later time or after storage.

In a further aspect, the invention is directed to a sheet production system that includes:

a sheet of material that moves in a machine direction (MD);

marking means for applying a series of MD position marks and corresponding position codes or numbers on the sheet of material along the MD;

reader means for position codes on the sheet of material;

sensor means for sensing a characteristic of the sheet of material at different locations along the MD to generate a characteristic profile of the sheet of material; and correlation means for correlating the characteristic profile with the series of position codes on the sheet of material.

In yet another aspect, the invention is directed to a method of monitoring a sheet of material includes:

(i) advancing a sheet of material that moves in a machine direction (MD);

(ii) applying a series of MD position marks and corresponding position codes or numbers onto the sheet of material along the MD;

(iii) recording the position codes that have been applied to create a database of position codes; and (iv) measuring a physical property of the sheet of material along the MD to generate a measurement profile that is recorded wherein measurements of the physical property are synchronized with the position codes from the database so that different portions of the measurement profile are associated with one or more accompanying position codes.

DETAILED DESCRIPTION OF THE PREFERRED EMBODIMENTS

Figure 1:
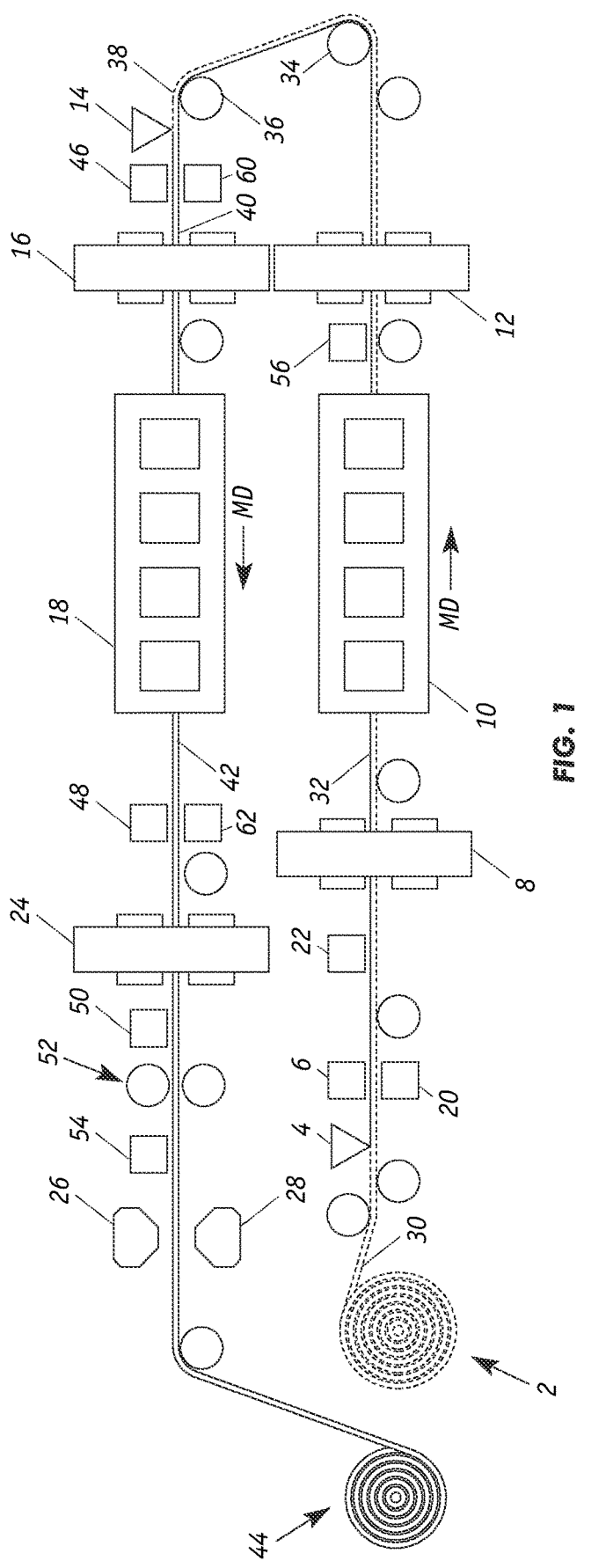
FIG. 1 depicts a roll-to-roll sheet production system for continuous coating of a metal substrate with anodic or cathodic materials.

FIG. 1 illustrates a process for coating a metal web or sheet that is used in fabricating electrodes for lithium-ion electrochemical cells and batteries. For making anodes, the electrode coating includes anodic active materials such as graphite and, for making cathodes, the electrode coating includes cathodic active materials such as a lithium metal oxide. Electrodes include a current collector metal foil that is coated on one or both sides of the foil with electrode slurry which can also include carbon black, binder and solvent. After the electrode slurry is applied on a side of foil, the wet coated foil is heated in a dryer to extract the solvent to leave a solid layer of electrode material which adheres to the metal foil. Copper foil is a preferred anode current collector material and aluminum foil is a preferred cathode current collector material. The foil is typically 9 to 50 μm thick and the electrode coating ranges from 75 to 400 μm in thickness on one or both sides of the foil so that a double-side coated electrode can have a caliper of up to 850 μm with most being typically about 250 μm thick.

As shown in FIG. 1, roll 2 is unwound by an unwinder and supplies a continuous sheet of metal web or sheet 30 that is coated on the top (or first) surface with a layer of electrode slurry by coater 4 which can comprise a tape casting coating device. The basis weight, thickness and other characteristics of the sheet of metal web 30 from roll 2 are usually known. Marking device 6 applies fiducial markers to the upper coated and/or uncoated regions while marking device 20 applies fiducial markers to regions of the lower (or second) surface which are uncoated. Alternatively, marking device 20 can be positioned downstream after a coater so as to apply fiducial markers onto coated regions. Reader 22 reads the fiducial markers and scanning gauge 8 measures the basis weight, thickness, or other properties of the electrode slurry. Applying fiducial markers on both sides of the sheet 30 is optional.

Coater 4 includes actuators that control the doctor blade to regulate the amount of slurry that is extruded onto sheet 30. Dryer 10 removes excess solvents and cures the slurry that is on the moving coated sheet 32 to form an electrode layer on the sheet. Reader 56 reads the fiducial markers and gauge 12 measures one or more properties of the moving coated sheet exiting dryer 10. Marker position readings obtained by reader 56 are employed to adjust the scan start and scan position and velocity of gauge 12 so as to precisely trace the measurement path of gauge 8. Thereafter rolling supports 34, 36 reverse the orientation of the moving sheet so that the second surface is now the uncoated top side whereupon coater 14 applies a layer of electrode slurry on the top or second surface of the moving sheet 38. Readers 46 and 60 read the fiducial markers on the second and first surfaces, respectively. Properties of the double-side coated sheet 40 are measured with gauge 16 before entering dryer 18. Similarly, marker position readings obtained by reader 46 and/or 60 are employed to adjust the scan start and scan position and velocity of gauge 16 so as to precisely trace the measurement path of gauge 8.

Readers 48 and 62 read the fiducial markers on the second and first surfaces after dryer 18, respectively, and device 24 measures properties of the electrode layers on the first and second surfaces. Device 24 uses marker position readings from readers 48 and/or 62 to adjust its scan start and scan position and velocity so as to precisely retrace the measurement path of gauge 8. Fiducial marker readings are performed in very close proximity to the measurement/scanner. In addition, the distance from the fiducial marker to the measurement/scanner is fixed and known so that the scan profile can be calculated and used to adjust for any position error. Finally, readers 50 and 54 are positioned upstream and downstream, respectively, of calender 52 which compacts and smooths the electrode layers. The readers 50 and 54 measure the distance between the fiducial markers before and after calender 52 to determine whether the sheet 42 stretched. A rewinder takes up the double-side coated sheet 42 into roll 44. Surface defects on the coatings are monitored by camera-based web inspection systems 26, 28. Although the process is illustrated as being continuous, it is understood that the various steps and attendant measurements can be performed in separately in discrete, discontinuous batch operations. For example, the roll 44 is subsequently subject to a slitting operation to form individual electrodes suitable for assembling into cells and batteries. The fiducial markers are used in the setup and threading processes.

Figure 2A:
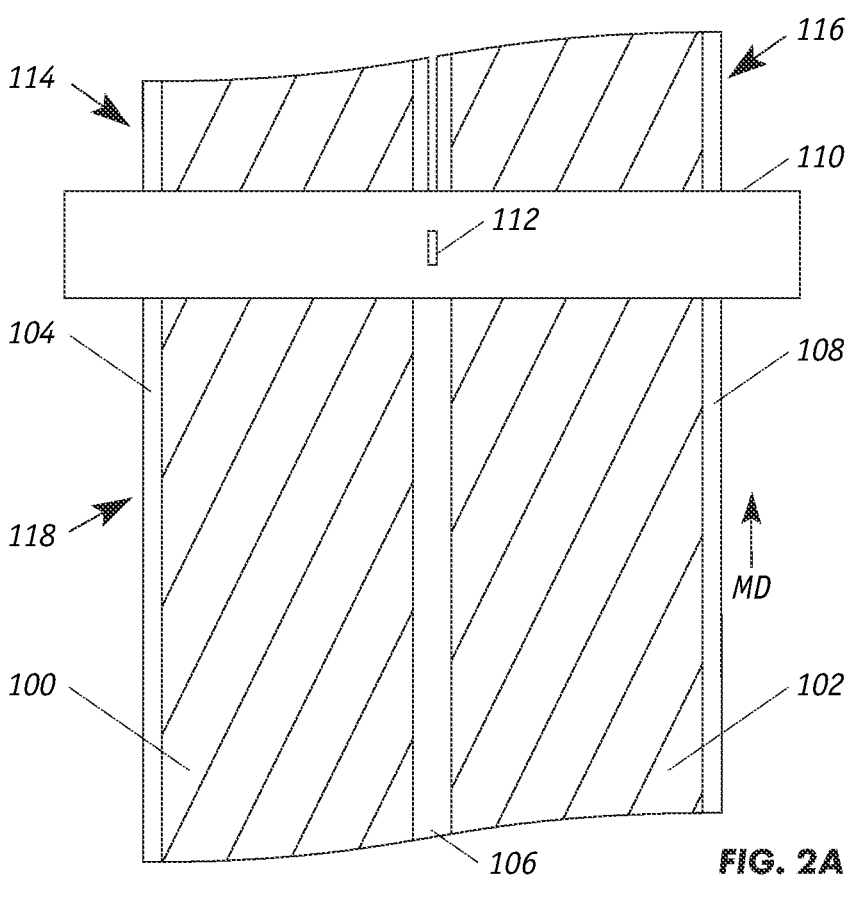
FIG. 2A is a plan view illustrating continuous strip coating onto a metal substrate.

FIG. 2A illustrates the strip coating technique for coating foils. As the metal substrate 118 moves in the MD, a continuous coating process applies two or more lanes of a slurry including an electrode active material onto a current collector. In this case, two lanes 100, 102 which are separated by an uncoated region 106 between are formed. The edges or sides 104, 108 of the metal substrate along the MD usually remain uncoated. The opposite or lower surface of the metal substrate is also similarly coated. The two lanes of slurry on the first side preferably overlap the two lanes on the second side. A slitter device 110 with blade 112 cuts region 106 along the MD to form two narrower metal substrate sheets 114, 116 each with a single continuous coating layer. The sheets 114, 116 can be cut along the CD to form individual double-side coated electrodes.

Figure 2B:
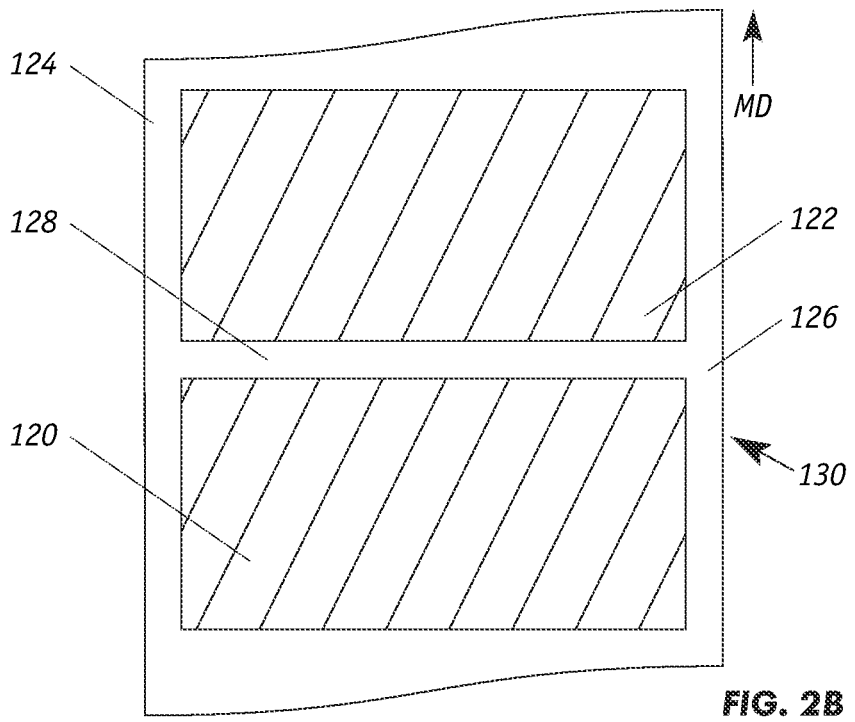
FIG. 2B is a plan view illustrating patch coating onto a metal substrate.

FIG. 2B illustrates the patch coating technique for coating foils. As the metal substrate 130 moves in the MD, an intermittent coating process applies a coating of slurry including an electrode active material onto a current collector to form a plurality of first patches 120, 122 of the slurry that is separated by an uncoated space 128 along the CD. The edges or sides 124, 126 of the metal substrate along the MD usually remain uncoated. For making double-side coated electrodes, the opposite side or lower surface of the metal substrate is also similarly coated with a plurality of second patches. The first patches and the second patches preferably overlap. The dimensions of each of the first patches can be different from those of the second patches. Individual double-side coated electrodes are formed by cutting the metal substrate along the uncoated space 128.

Figure 3A:
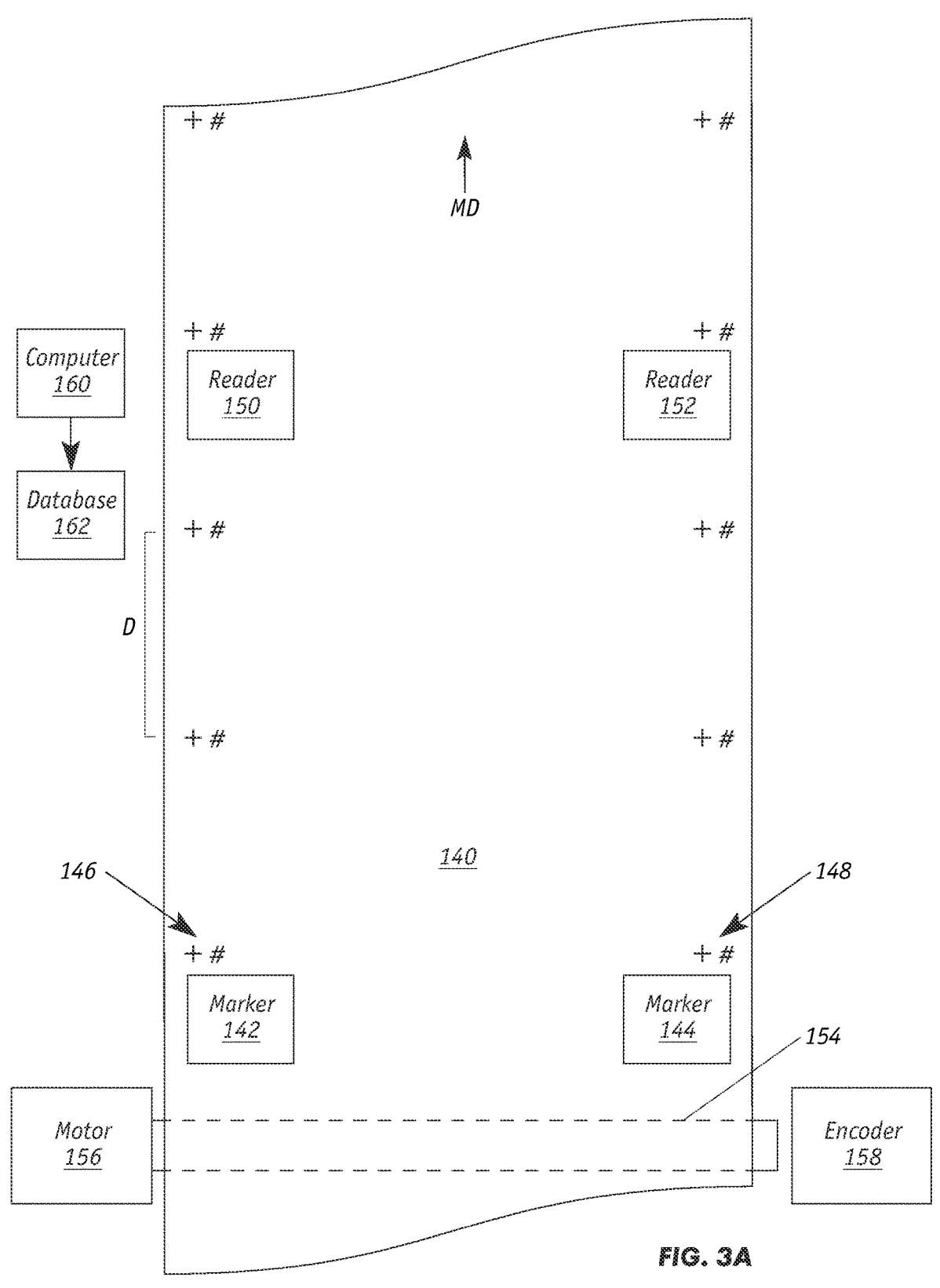
FIGS. 3A and 3B are plan views depicting systems for applying fiducial markings on a continuous moving sheet.

FIG. 3A shows a system for applying a series of fiducial markers that include reference marks or markings and associated tracing codes onto a moving sheet of material 140. Stationary marker device 142 is positioned over the sheet to apply a series of fiducial markers 146 along one edge of the moving sheet while stationary marker device 144 is positioned over the sheet to apply another series of fiducial markers 148 along the opposite edge of the moving sheet. Each series of fiducial markers is aligned along the MD. In the event the sheet is slit along the MD, each series of fiducial markers can be employed separately. The reference mark or marking is configured as a horizontal line that is perpendicular to the MD and a vertical line that is parallel to the MD. A preferred configuration of the reference mark is cross-shaped or plus "+" sign. Successive horizontal elements or components of the reference marks are separated by distance D. The vertical elements or components of the reference mark are formed a specific known distance from the adjacent sheet edge. The tracing code uniquely identifies each associated reference mark. The sheet 140 is supported and transported by roller 154 whose speed is monitored by encoder 158. The marker devices can be any suitable device that generates sufficiently permanent marks on the metal substrate and/or coating. Lasers can be used to mark metal and inkjet printers can be used to print marks on paper, plastic, and fabrics.

In operation, computer 160 regulates motor 156 to control the MD speed. It should be understood that motors to advance the sheet in the MD can be positioned elsewhere in the process such as in the unwinder and rewinder rollers or at the calender. A conventional computer that includes a processor and storage (memory) such as a laptop computer can be used. The markers 142 and 144 each periodically mark the uncoated area of the sheet with the fiducial markers which are tracked to a time or a roll encoder measurement generated by encoder 158. The code from the encoder could be, for example, an encoder count, millisecond time, or a number or computer readable code which is associated with such quantities. The code is stored in database 162. The codes are unique so they cannot be duplicated. As further described herein, readers 150, 152, such as optical character recognition detectors, scans the fiducial markers. It is understood that the fiducial markers can be apply to any part of the moving sheet 140 including the uncoated and/or coated areas.

Figure 3B:
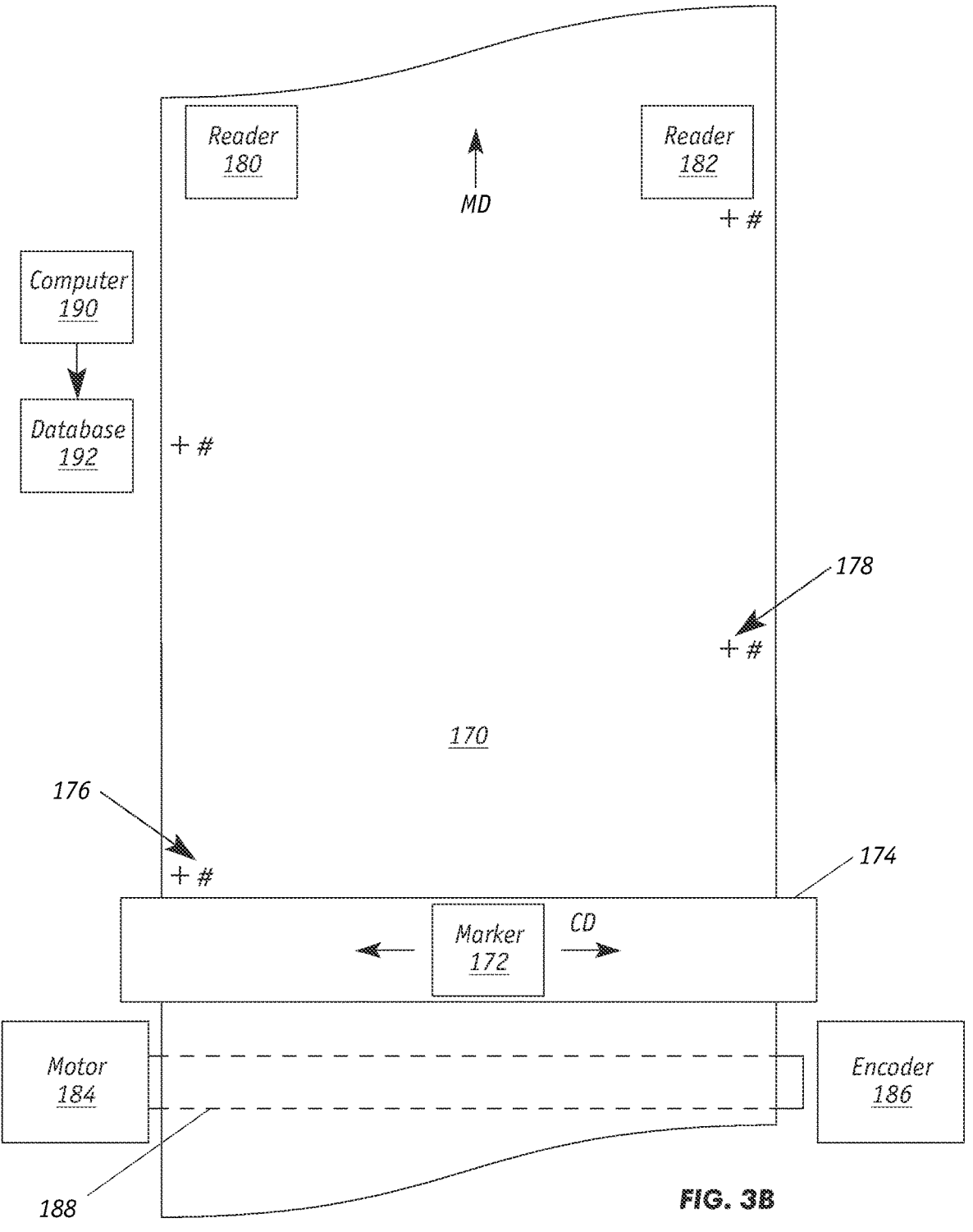

FIG. 3B shows another system for applying a series of fiducial markers on a moving sheet of material 170. Scanning marker 172, which is secured to frame 174, moves along the cross direction (CD) over the sheet to apply a series of fiducial markers 176 along one edge of the moving sheet and another series of fiducial markers 178 along the opposite edge of the moving sheet. Each series of fiducial markers is aligned along the MD. The sheet 170 is supported and transported by motor 184 controlled roller 188.

Computer 190 instructs marker device 172 to periodically mark the uncoated area of the sheet with the fiducial markers which are tracked to a time or a roll encoder measurement generated by encoder 186. The codes from the encoder could be stored in database 192. As further described herein, readers 180, 182 detect the fiducial markers.

Figure 4:
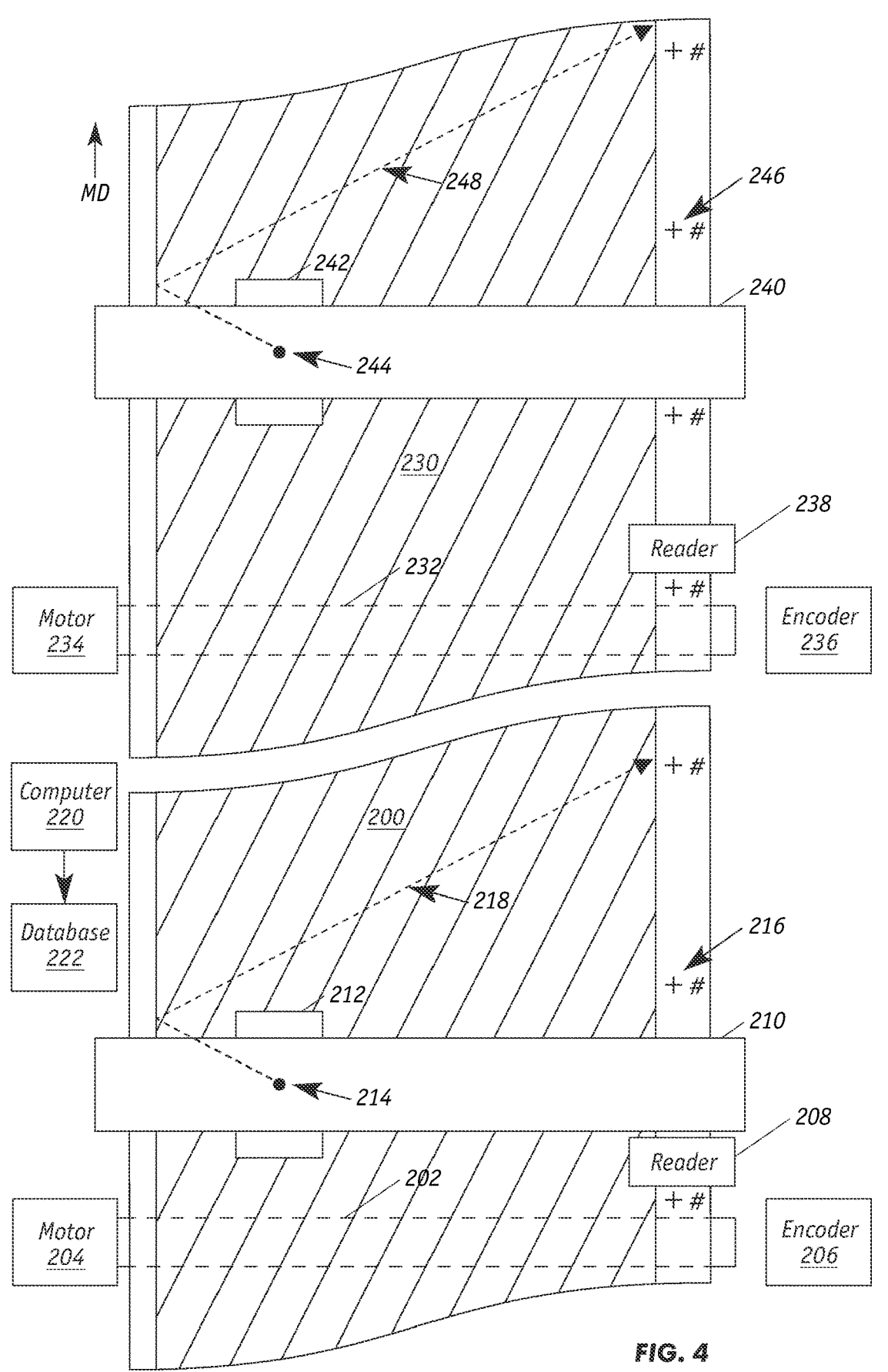
FIG. 4 is a plan view illustrating electrode fabrication employing fiducial markers to establish traceability of measurements by reading the fiducial markers on a continuous moving sheet and coordinating measurements using the marks.

FIG. 4 illustrates the use of the fiducial markers in tracking different measurements of electrode layer(s) on a moving sheet in order to improve traceability of battery electrodes. Electrode layer 200 is coated on a moving substrate (foil) that is supported and transported in the MD by roller 202 which is operated by motor 204. Encoder 206 monitors the speed of roller 202. Reader 208 recognizes fiducial marker characters 216 on the uncoated side of the moving sheet. Frame 210 supports scanning device 212 that includes a gauge which measures the basis weight and/or thickness of the coated sheet. The scanning device periodically traverses coated sheet 200 generally at a constant speed. The gauge is shown measuring spot or area 214 of the coated sheet 200. The gauge does not measure the selected sheet property at locations which are aligned exactly perpendicular to the longitudinal edges of the sheet. Instead, because of the sheet velocity, the scanning device travel diagonally across the coated sheet surface, with the result that consecutive scanning paths have a zig-zag pattern with respect to the direction perpendicular to the longitudinal edges of coated sheet 200. An example of such a zig-zag pattern is scanning path 218 which would be traced by the gauge as the scanning device 212 traverses the surface of sheet during back-and-forth consecutive scans. The angles of the scanning path relative to the true CD depend upon the cross-directional velocity of the scanning device and upon the machine-directional velocity of the coated sheet 200 which is known. The zig-zag pattern of interrogations spots covers a relatively small portion of the coated sheet 200 surface.

Computer 220 coordinates the measurements by scanning device 212 so that the locations of interrogation spots in pattern 218 are recorded in database 222 along with the corresponding fiducial markers. In this fashion, when the coated sheet 200 is cut into individual electrodes, the measurements made on each electrode are known, moreover, electrochemical cells and batteries incorporating these electrodes can be identified by serial numbers that will allow the measurements to be retrieved.

Another feature of the present invention is that the fiducial markers can be employed to synchronized subsequent measurements to prior measurements. For example, coated sheet 200 of FIG. 4 after being measured by sensor 212 can be removed to another line for further processing such as for drying or calendering. Thereafter, the so-treated coated sheet 230 is formed and is subject to a second measurement. Sheet movement is supported on rollers 232 and frame 240 secured a second scanner device 242. Computer 220 controls motor 234, encoder 236 and scanner device 242 so as to synchronize second measurements by scanner device 242 with the first measurements executed downstream by scanner device 212. Reader 238 detects the fiducial markers 246 and scanning device 242 can be reset to commence measurements at interrogation spot 244 so that the interrogation spots in pattern 248 coincide with those in zig-zag pattern 218.

If scanners 212 and 242 are well aligned such that the coated sheet edges are measured are at the same scanner bins on both scanners, when scanner 212 was at a first scanner position along the CD and detects a specific fiducial marker, then when scanner 242 detects the same specific fiducial marker, the scanner 242 should also be at the same first scanner position along the CD. However, in practice even if scanners are well aligned, the moving coated sheet can wander from side-to-side in the CD and therefore it is necessary to adjust operations to account for this motion by using edge detection. The edge of the moving sheet can be designated as being detected at a specific fiducial marker xxx+ number of encoder counts. In particular, the computer will receive a signal when one of the fiducial markers is read. However, these can be far apart so in order to monitor the sheet between successive fiducial markers, encoder signals can be used. In particular, the encoder sends pulses at much higher rates so computer can interpolate positions between fiducial markers using the pulses. The same would apply to the next scanner in the process.

Referring to FIG. 4, the vertical element or component of the fiducial makers 246 can be used to denote the CD position of the coated sheet 200 and 230. The vertical elements can be used to of an edge detector. The same marker readers 208, 238 that detect the horizontal elements of the fiducial markers to monitor the MD positions of the coated sheets can also denote the CD position using the vertical elements. The CD position information can be used to adjust the position of the scanner 212, 242 and to compensate for sideways (CD) movement.

As the second measurements by scanning device 242 are made, the locations of the interrogation spots in pattern 248 are recorded in database 222 along with the corresponding fiducial markers. The database thus has a library of first and second measurements that were made on essentially the same interrogation spots. When the coated sheet is cut into individual electrodes and assembled into electrochemical cells and batteries, these electrodes can be identified by serial numbers that will allow both first and second sets of measurements to be traced.

Referring to FIG. 4, the MD speeds for sheet 200 and 230 can be different so that the position of downstream scanner 242 is adjusted so that its CD motion coincides with that of scanner 212. Most of the time, the MD speeds for both sheets are the same so that the scanners will have the same speed profile. It should be noted that scanners are often accelerating or decelerating at the sheet edges so the scanner CD motion is more complex than just a constant speed.

During fabrication of electrodes, the length of the moving sheet can fluctuate to 1 percent or more. For instance, calendaring which presses the coated moving sheet can cause stretching of the metal substrate. As shown in FIG. 4, the distance between the horizontal line of the reference marks of fiducial markers 246 can be measured using the reader 238 and encoder 236. This measured distance is compared to the distance between the horizontal lines of the reference marks of fiducial marker 216. If there is any change in length, adjustments to the MD speed of the moving sheet 230 and/or the CD scanning speed of the scanner device 242 can be executed to so that the interrogation spots in zig-zag pattern 248 match those of zig-zag pattern 218, to the extent possible.

Referring to FIG. 3A, another technique of implementing the invention is to apply a series of MD position markers and corresponding position codes or numbers on sheet 140. In this case, the fiducial markers 146, 148 can consist of a series horizontal lines as position markers along the MD and the positions codes or numbers, can be the encoder readings. The fiducial markers are applied every x distance, for example, 10 or 20 cm). For example, the first fiducial marker that is generated by marker 146 on sheet 140 is MD position marker 001, the next fiducial marker is marker number 002 and so forth. The encoders generate pulses that can provide distance readings that are relative to first fiducial marker. That is the distance will continue increasing and the computer, which has all the measured quality data, is configured to read the codes. Should there be a break in middle of the sheet, the horizontal lines and corresponding codes can be employed to re-align measurements.

Sensors for measuring the thickness and other properties of a coated metal substrate are described in U.S. Pat. No. 11,143,495 to Hughes et al. and US Pub. No. 2021/0262776 to Tixier and Hughes, which are incorporated herein by reference. A sensor for measuring free standing sheets such as paper and plastic is described in US Pub. No. 2018/0172432 to Hughes et al., which is incorporated herein by reference.

Figure 5:
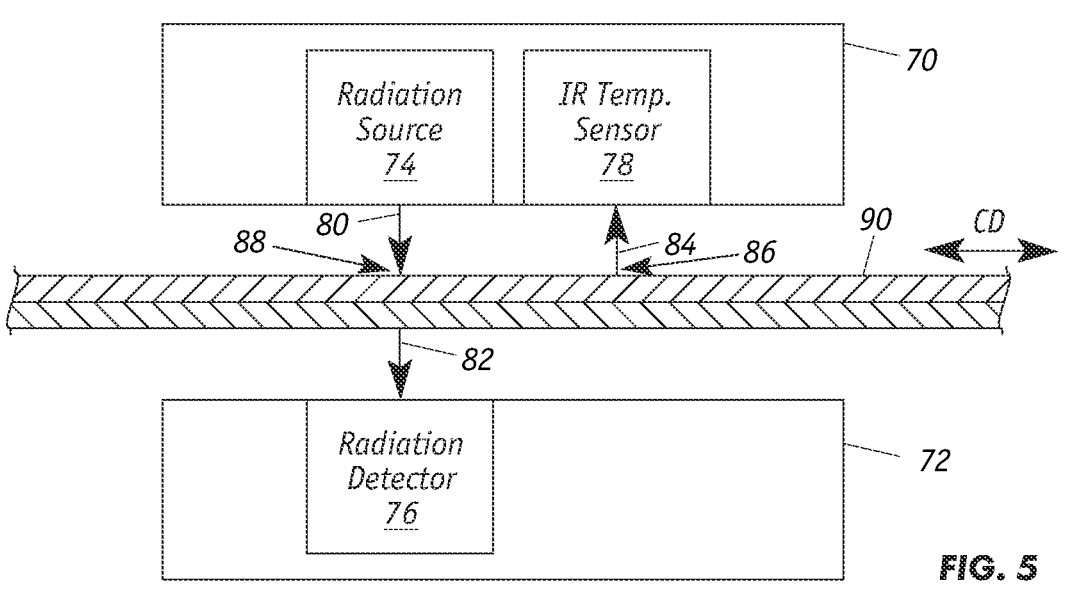
FIG. 5 depicts dual scanning heads with basis weight and temperature sensors.

FIG. 5 is a scanning device, for measuring properties of a moving sheet of material, which includes scanning heads 70, 72 that enclose or house radiation source 74 and radiation detector 76, respectively. The radiation source 74 emits radiation 80, such as beta rays, that is directed toward an area 88 on the coated sheet 90 which is moving in the MD. The intensity of the radiation 82 which is transmitted through the coated sheet is sensed by radiation detector 76. The detector senses the amount of radiation absorbed by the coated sheet which gives a direct indication of the basis weight of the material. In this example, radiation source 74 emits beta radiation for the measurement of basis weight or thickness. Scanner head 70 also houses an infrared sensor 78 that detects radiation 84 from spot 86 and yields a sheet temperature profile. Although spots 86 and 88 are shown to be offset for illustrative purposes, the spots can coincide by positioning the IR temperature sensor 74 above the radiation source 74. Another technique is optical translation for moving the interrogation spot as described in U.S. Pat. No. 7,528,400 to Duck and Hughes, which is incorporated herein by reference.

Figure 6:
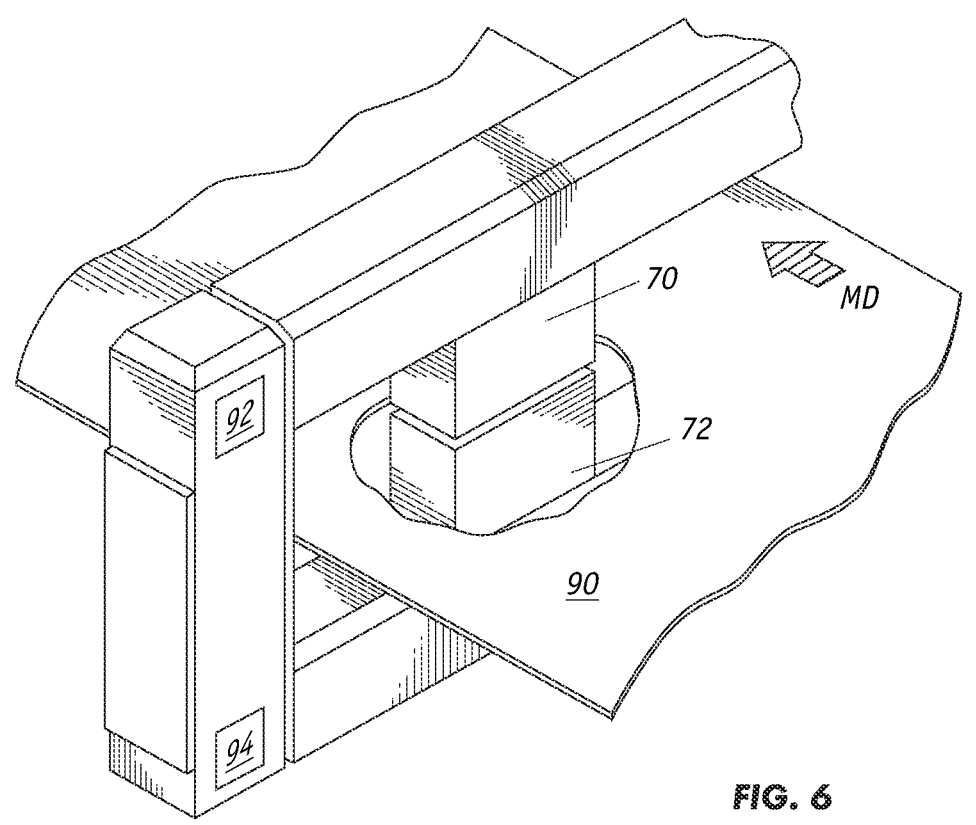
FIG. 6 depicts an online scanning system with dual scanning heads.

As illustrated in FIG. 6, the operative faces of the dual scanner heads 70, 72 define a measurement gap that accommodates coated sheet 90 which moves in the MD. Motors 92 and 94 control the movement of heads 70 and 72, respectively. The cross directional movement of the dual scanner heads is synchronized with respect to speed and direction so that they are aligned with each other.

Instead of using a scanning sensor, a single or an array of fixed-point sensors positioned across the sheet in the cross direction can be employed. By arranging successive arrays so that the individual sensors are aligned, the interrogations spots will be same for all the measurement. In this configuration, each array of sensors generates measurements forming a set of profile vs. tracing codes for the length of the moving coated sheet. When a sheet with coated electrode material is cut into individual electrodes, the various sets of measurement profiles for each electrode are known and retrievable from a library from the database.

Figure 7:
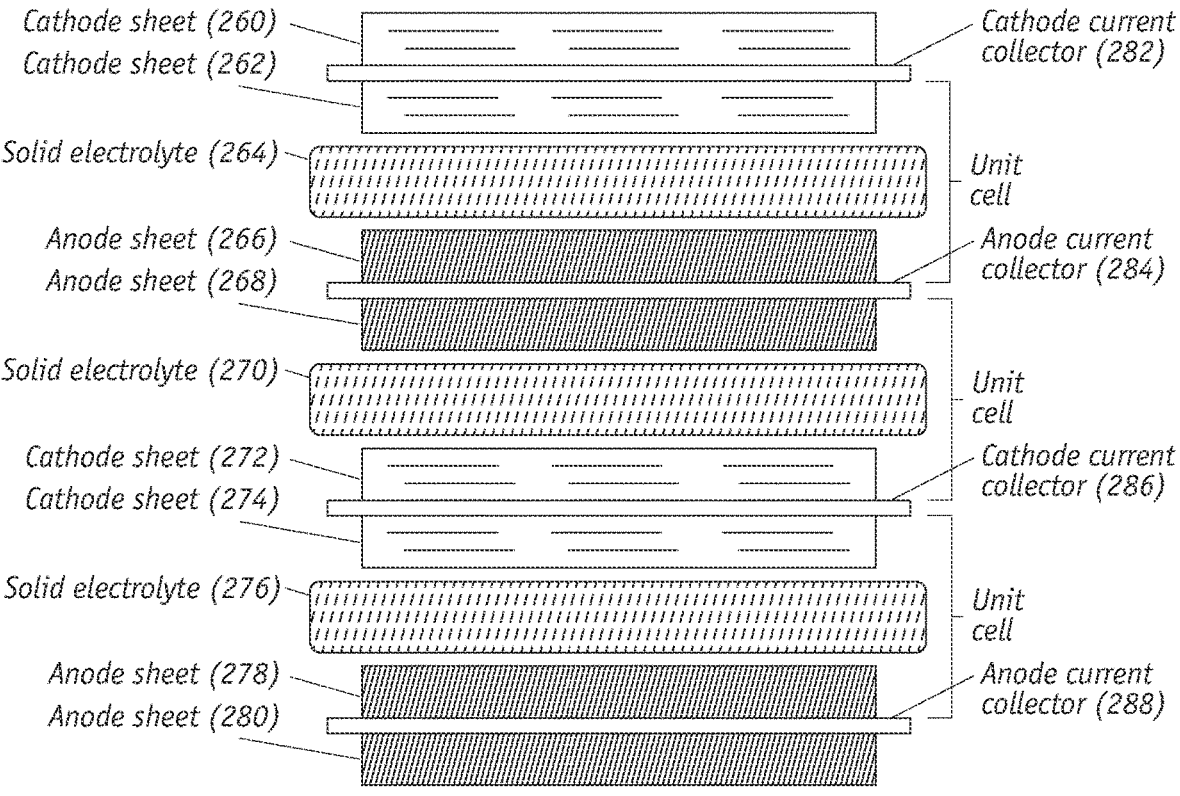
FIG. 7 shows an electrochemical battery.

An electrochemical battery as shown in FIG. 7 a plurality of unit cells with cathode sheets 260 and 262 that are connected to cathode current collector 282, anode sheets 266 and 268 that are connected to anode current collector 284, cathode sheets 272 and 274 that are connected to cathode current collector 286, and anode sheets 278 and 280 that are connected to anode current collector 288. The solid-state electrolytes 264, 270 and 274, which are preferably polymer separator membranes, are positioned between the anodes and cathodes. The measurement profiles associated with the anode and cathode layers are assigned to the battery which is identified by a unique serial number and recorded for access.

While the invention has been illustrated in measuring characteristics of coated metal sheets, it is understood that the invention can be monitored moving sheets in general which include, but are not limited to, paper, plastic, fabrics and the like. Paper is made in a continuous process where a web of paper is formed from an aqueous suspension of fibers (stock) on a circulating mesh wire located at the wet end and water drains by gravity and vacuum suction through the wire. The web is then transferred to the dry end for pressing, drying and calendering. Since the sheet of paper is not formed on a substrate, the fiducial markers are applied to the paper itself preferably at the dry end when the paper has reached the necessary consistency so the fiducial markers remain sufficiently permanent on the paper. Papermaking is described in U.S. Pat. No. 9,309,625 to Backstrom and Forbes and U.S. Pat. No. 8,021,517 to Hughes and Tixier, which are incorporated herein by reference.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method of monitoring a sheet of material comprising:
   i. advancing a sheet of material that moves in a machine direction (MD);
   ii. applying a series of reference markers and associated tracing codes onto the sheet of material along the MD;
   iii. recording the associated tracing codes that have been applied to create a database of tracing codes; and
   iv. measuring a first physical property of the sheet of material along the MD to generate a measurement profile that is recorded wherein measurements of the first physical property are synchronized with the associated tracing codes from the database so that different portions of the measurement profile are associated with one or more accompanying associated tracing codes,
      wherein step (iv) uses a first sensor that is mounted to a first scanner that traverses back and forth along a cross direction (CD) across the sheet of material wherein the first sensor measures first properties from first interrogation spots on the sheet of material.

2. The method of claim 1 further comprising measuring a second physical property of the sheet of material along the MD to generate a second measurement profile that is recorded wherein measurements of the second physical property are synchronized with the associated tracing codes from the database so that different portions of the second measurement profile are associated with one or more accompanying the associated tracing codes.

3. The method of claim 2 wherein measuring the second physical property uses a second sensor that is mounted on a second scanner, which is located downstream of the first sensor, and that traverses back and forth along the CD across the sheet of material, wherein the second sensor measures the second properties from second interrogations spots on the sheet of material, wherein operation of the second scanner is synchronized using the associated tracing codes from the database so that the second interrogation spots match the first interrogation spots.

4. The method of claim 1 comprising identifying a position of a reference marker and initiate measuring the first physical property using the identified position of the reference marker to synchronize movement of the sheet of material with the measurement.

5. The method of claim 1 comprising identifying positions of a plurality of reference markers and determining whether a distance or distances between the plurality of reference markers have changed.

6. A method of preparing electrodes comprising:
   i. providing a sheet of metal substrate which moves in a machine direction (MD);
   ii. applying one or more coatings of electrode material onto the sheet of metal substrate to form a moving sheet of metal substrate having one or more coated regions and one or more uncoated regions;
   iii. applying a series of reference markers and associated tracing codes onto the sheet of metal substrate, wherein step (ii) occurs before or after step (iii), to form a moving sheet of metal substrate having one or more coated regions and one or more uncoated regions wherein (a) in the case wherein step (ii) occurs before step (iii), the series of reference markers and the associated tracing codes are applied onto the one or more uncoated regions whereas (b) in the case wherein step (iii) occurs after step (ii), the series of reference markers and the associated tracing codes are applied onto the one or more uncoated regions and/or onto one or more coated regions;

iv. recording the associated tracing codes that have been applied to create a database of the associated tracing codes;

v. measuring a first physical property of the one or more of the coated regions along the MD to generate a measurement profile that is recorded wherein measurements of the first physical property are synchronized with the associated tracing codes from the database so that different portions of the measurement profile are associated with one or more accompanying the associated tracing codes, and after step (v), cutting the sheet of metal substrate to form a plurality of electrodes; and using the recorded associated tracing codes from the database to assign each electrode with a portion of the measurement profile that is recorded.

7. The method of claim 6 wherein step (ii) occurs before step (iii) and the series of reference markers and the associated tracing codes are applied onto the sheet of metal substrate that is defined by one or more uncoated regions.

8. The method of claim 6 wherein step (v) uses a first sensor that is mounted to a first scanner that traverses back and forth along the cross direction (CD) across the sheet of metal substrate wherein the first sensor measures first properties from first interrogations spots on one or more of the coated regions.

9. The method of claim 6 further comprising measuring a second physical property of the one or more of the coated regions along the MD to generate a second measurement profile that is recorded wherein measurements of the second physical property are synchronized with the associated tracing codes from the database so that different portions of the second measurement profile are associated with one or more accompanying the associated tracing codes.

10. The method of claim 9 wherein measuring the second physical property comprises uses a second sensor that is mounted on a second scanner, which is located downstream of the first sensor, and that traverses back and forth along the CD across the sheet of metal substrate wherein the second sensor measures the second properties from second interrogations spots on one or more of the coated regions, wherein operation of the second scanner is synchronized using the associated tracing codes from the database, so that the second interrogation spots match the first interrogation spots.

11. The method of claim 6 comprising identifying a position of a reference marker and initiate measuring the first physical property using the position of the reference marker to synchronize movement of the sheet of metal substrate with the measurement.

12. The method of claim 11 comprising using an optical character scanner to identify the position of the reference marker.

13. The method of claim 6 comprising identifying positions of a plurality of reference markers and determining whether a distance, or distances between the plurality of reference markers has changed.

14. The method of claim 6 comprising changing the speed that the sheet of metal substrate moves in response to changes in a distance, or distances between the plurality of reference markers, so that step (v) is synchronized.

15. The method of claim 6 wherein the database includes a library of the associated tracing codes and their corresponding measurement profiles.

16. The method of claim 15 wherein the measurement profiles contain two or more sets of measurement profiles.

17. A method of monitoring a sheet of material comprising:

i. advancing a sheet of material that moves in a machine direction (MD);

ii. applying a series of MD position marks and corresponding position codes onto the sheet of material along the MD;

iii. recording the corresponding position codes that have been applied to create a database of codes; and iv. measuring a physical property of the sheet of material along the MD to generate a measurement profile that is recorded wherein measurements of the physical property are synchronized with the corresponding position codes from the database so that different portions of the measurement profile are associated with one or more accompanying the corresponding position codes; and wherein step (iv) uses a first sensor that is mounted to a first scanner that traverses back and forth along a cross direction (CD) across the sheet of material wherein the first sensor measures first properties from first interrogations spots on the sheet of material.

* * * * *